INVENTOR
ALBERT A. BRADLAU
BY
Hopgood & Calimafde
ATTORNEYS

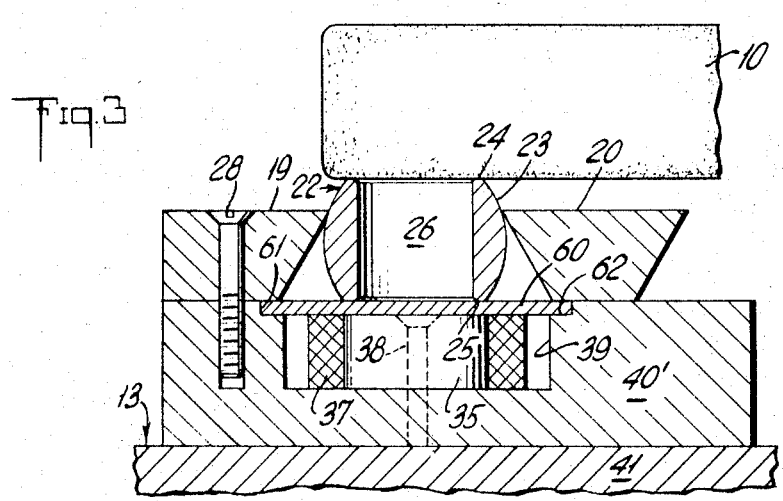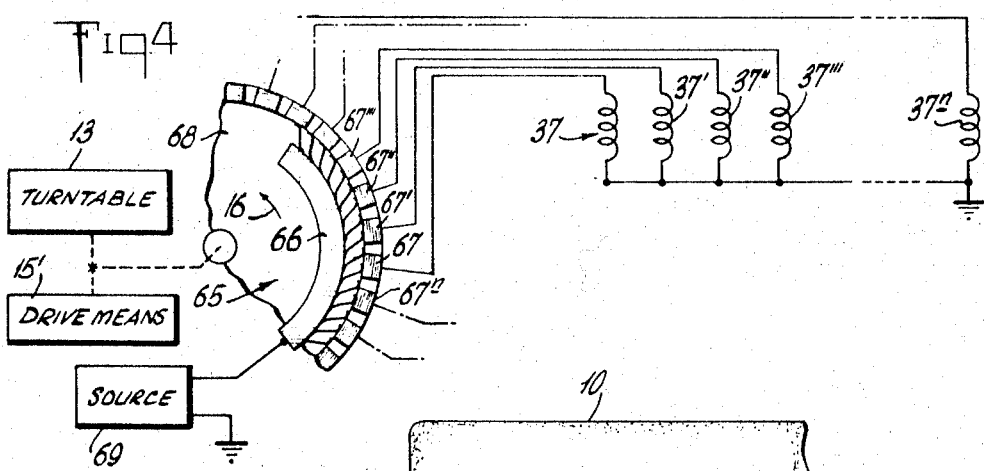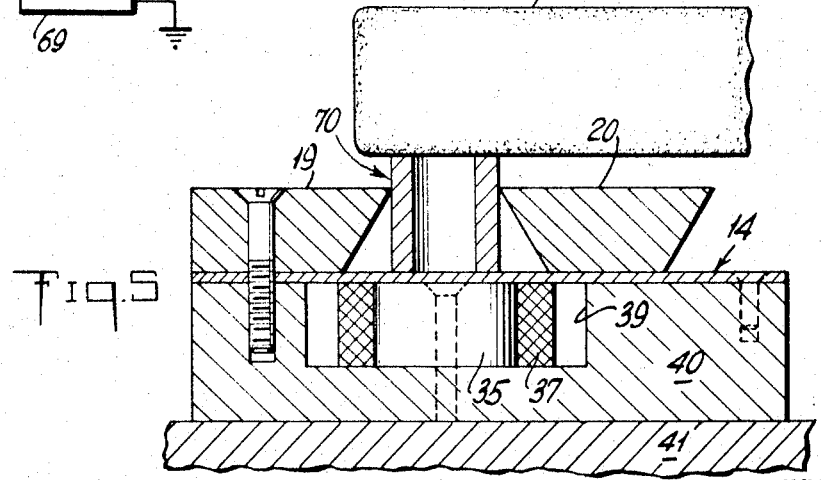

United States Patent Office 3,461,621
Patented Aug. 19, 1969

3,461,621
MACHINE FOR FACE-GRINDING BEARING RINGS OR THE LIKE
Albert A. Bradlau, Plainville, Conn., assignor, by mesne assignments, to Textron Inc., Providence, R.I., a corporation of Delaware
Filed June 27, 1967, Ser. No. 649,291
Int. Cl. B24b 5/00, 41/06
U.S. Cl. 51—134                                19 Claims

ABSTRACT OF THE DISCLOSURE

A machine for face-grinding bearing rings, wherein the flat end face of a relatively large abrasive wheel is relied upon for grinding. Rings to be ground are positioned, axial-end up, on the annular ring-supporting surface of a relatively large turntable, in such partial overlap with the grinding surface as to assure a given grinding period for each ring brought (by turntable rotation) into the overlap region. Each ring is held by wedge action in the tapered slot defined between spaced finger elements fixed to the annular turntable surface, and magnet action at this surface may enhance chucking action.

---

My invention relates to a machine for grinding axial end faces of generally cylindrical rings, such as bearing rings. The invention is particularly concerned with mechanism for positioning such rings for face-grinding.

Most bearing rings are generally cylindrical, with a bore of adequate proportions so that inner or outer surfaces lend themselves to adequate chucking, for face-grinding an axial end face. However, for smaller size ranges, and for situations in which the outer surface is not cylindrical, as for example, the inner spherical ring of a plain-spherical bearing, a problem is presented in the adequate chucking of the ring for face-grinding the relatively small area of the axial end face. This problem is aggravated when higher production is demanded from a given grinding machine.

It is, accordingly, an object of the invention to provide an improved machine of the character indicated.

Another object is to provide a machine meeting the above object and specifically effective in the chucking of a range of ring sizes to be face-ground.

A further object is to meet the above objects with a machine inherently capable of handling a smooth continuous flow of rings to be face-ground in production quantities.

A specific object is to provide chucking mechanism of the character indicated, inherently capable of supporting either straight-cylindrical or truncated-spherical rings, of a variety of radial and axial dimensions, for end-face grinding, all without change of the chucking means.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 2 is an enlarged fragmentary sectional view taken generally in the plane 2—2 of FIG. 1, but with the ring-supporting region taken generally in the plane 2a—2a;

FIG. 3 is a view similar to FIG. 2 to show a modification;

FIG. 4 is a fragmentary electrical diagram schematically depicting control means for the modification of claim 3; and FIG. 5 is a view similar to FIG. 2, to illustrate support of a different type of ring.

Briefly stated, the invention is shown in application to a machine for face-grinding bearing rings, wherein the flat end face of a relatively large abrasive wheel is relied upon for grinding. Rings to be ground are positioned, axial-end up, on the annular ring-supporting surface of a relatively large turntable, in such partial overlap with the grinding surface as to assure a given grinding period for each ring brought (by turntable rotation) into the overlap region. Each ring is held by wedge action in the tapered slot defined between spaced finger elements fixed to the annular turntable surface, and magnet action at this surface may enhance chucking action.

Figure 1:
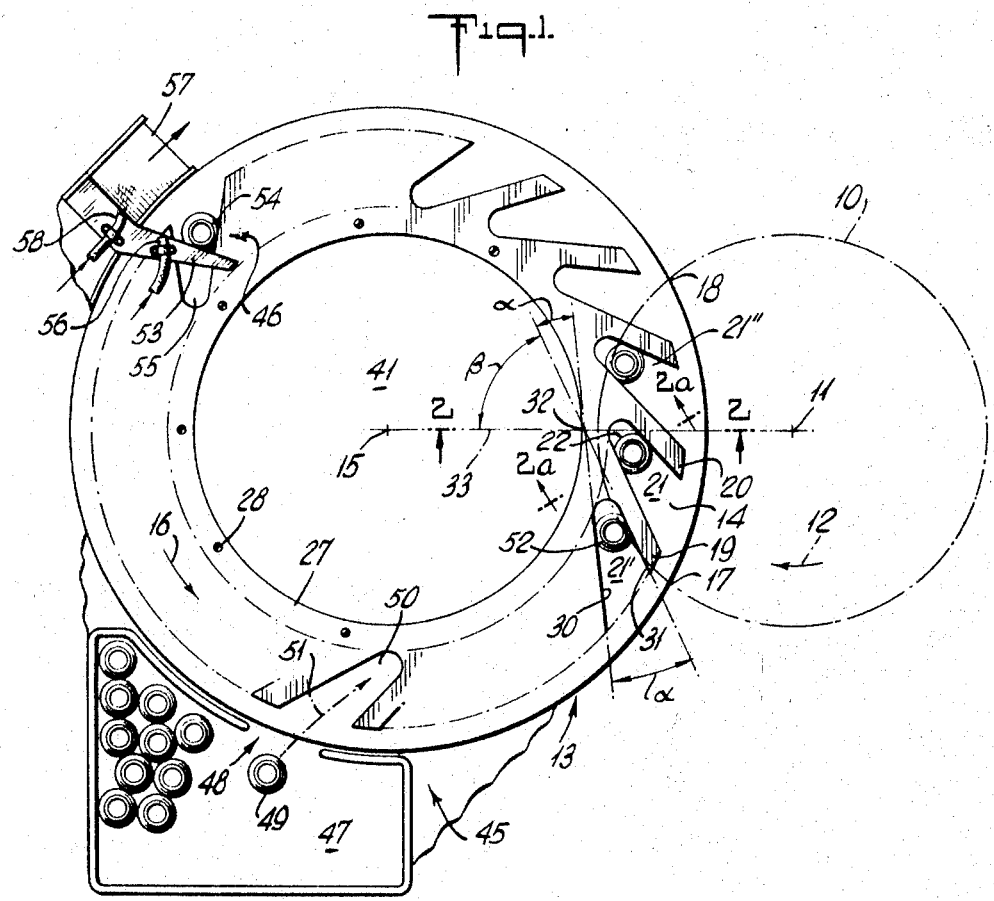
FIG. 1 is a plan view of important elements of a machine of the invention, certain parts being broken-away and others in phantom, in order to reveal detail.
Figure 2:
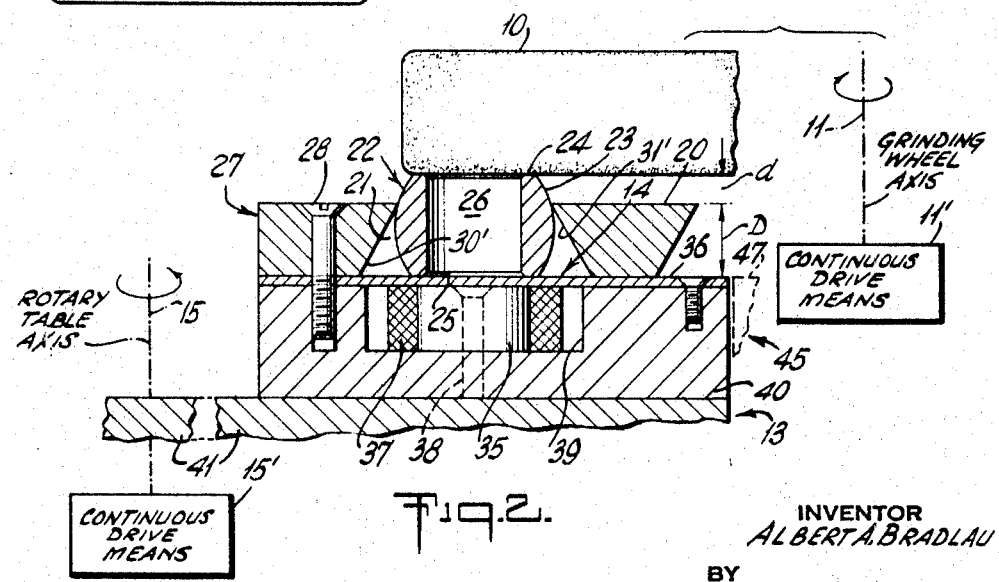

Referring to FIGS. 1 and 2 of the drawings, the grinding machine incorporating my invention is seen to comprise a large abrasive wheel 10 which may be continuously driven on a vertical axis 11, by suitable means 11', in the direction indicated at 12. A relatively large turntable 13 includes an upper ring-supporting flat annular surface 14 and is rotated about the vertical axis 15, in the direction 16, by suitable means 15'. The spacing or offset between axes 11–15 is adjusted (by means not shown) to assure a substantial region of overlap by the abrasive wheel 10 above the ring-supporting surface 14; the region of overlap is identified by limits 17–18.

In accordance with the invention, plural spaced finger elements 19–20 are secured to the annular surface 14 in such manner as to define plural spaced outwardly open tapered slots, such as the slot 21 between elements 19–20 for wedged reception and retention of a steel bearing ring 22 for face-grinding. In FIG. 2, the particular bearing ring 22 happens to be the inner ring for a plain spherical bearing; it thus has an outer spherical surface 23 which is truncated to define opposite axial ends 24–25, and an axial bore 26 extends between the end faces 24–25. The finger elements, as at 19–20, may be separate pieces independently secured to the turntable but, in the form shown, the entire plurality of such elements is integrally formed as the slotted periphery of a continuous ring or plate 27, secured as at 28, to the turntable 13.

All finger elements (19–20) extend in part radially and in part circumferentially, with respect to the turntable axis, in such manner that ring-receiving slots (21) diverge and are open in the radially outward direction. Thus, near one limit (17) of the region of overlap the orientation of a slotted opening is generally tangential with respect to the abrasive-wheel periphery; and, near the other limit (18), where the wheel 10 leaves grinding contact with a supported bearing ring, the slotted-opening orientation may be at or may have passed the location where it faces generally radially with respect to the grinding axis 11. For the described direction of rotation, this relationship assures that initial grinding contact shall be in a direction to enhance the firmness of wedged-ring support, and that the parting contact with any given ring may involve reacting ring support by a finger member extending substantially normal to the instantaneous grinding force. Generally speaking, the major work of grinding will have been accomplished well prior to the parting-contact relationship, so that a greater overlap region than that shown may be safely tolerated; in orther words, the described normal direction of reacting ring support may have occurred prior to the parting contact relation.

Preferred relationships are indicated by angles $\alpha$ and $\beta$ for the case of slotted opening 21' in FIG. 1. For this particular opening, adjacent edges 30–31 of adjacent finger elements are formed with a taper angle $\alpha$, the projections of these edges intersecting at 32. The radially outer one (31) of these edges, when projected, makes the angle $\beta$ with a radial strobe 33 from center 15 to the intersection 32. Preferably, the angle $\alpha$ is in the range of 8 to 20 degrees, the angle of substantially 10 degrees being found quite satisfactory for a range of spherical inner-ring sizes from substantially 3/4-inch to substantially 1.5-inch outer diameter. The angle $\beta$ may be from 50 to 70 degrees, and 60 degrees has been satisfactory where the abrasive wheel and turntable diameters were approximately three feet and five feet, respectively.

In order that the wedge fit for support of ring 22 shall be utmost stabilizing effect, I prefer to undercut the edges of adjacent finger elements (19–20) defining each slotted opening (21). Thus, in FIG. 2, the edge faces 30'–31' are beveled, so as to grip the spherical surface 23 at an elevation D above the surface 14. For support of spherical rings, the dimension D is at least one-half the axial extent (between end faces 24–25) for the largest diameter ring accommodated by slot 21; the dimesion D is also less than the axial extent of the smallest-diameter ring accommodated by slot 21. This allows an amount $d$ by which a ring 22 will project above the top surface of the slotted plate 27, permitting clearance for face-grinding the desired surface 24.

To complete the description of my preferred chuck structure, I show in FIG. 2 that it may additionally include magnet means operative at the annular surface 14 to attract the work (ring 22) and to thereby additionally stabilize work-positioning. The magnet means is shown to include a pole piece or magnetic element 35 immediately beneath the work, in slightly spaced relation, as determined by a surfacing sheet of non-magnetic material 36 such as aluminum. The magnetic element 35 may be permanently polarized or, as shown, it may be excited by winding means 37. Magnetic element 35 and its winding 37 are mounted by suitable means 38 in a recess 39, and recess 39 is shown formed in an adapter 40 carried by the base 41 of turntable 13.

For the situation in which the finger-elements 19–20 and the base adapter are of magnetic flux-conducting material, the described structure will be seen to provide enhanced magnetic retention of the work-piece 22, in that the work-piece 22, being of magnetic flux-conducting material, serves virtually to close all gaps in each of two magnetic-flux paths—from pole-piece 35 via base 40 and finger element 19, and from pole-piece 35 via base 40 and finger element 20.

In use, work-pieces to be ground are available and are inserted in successive open chucking slots at a loading station 45, and finished pieces are removed at an unloading or discharge station 46, respectively on opposite sides of the grinding or overlap region 17–18.

A fenced loading platform 47 holds a suitable quantity of work-pieces to be face-ground, at an elevation which matches that of the annular surface 14 and is in close radial clearance therewith. A simple gate opening 48 in the fenced platform enables the operator, with a simple manual operation, to merely slide a selected work-piece 49 to be insetred in an open slot 50, as suggested at 51 in FIG. 2. Wedge-action and magnet-action immediately take over positioning control of the inserted work-piece, and the operator can select the next unground work-piece, anticipating arival of the next open slot at gate 48.

Grinding commences substantially at the instant depicted for work-piece 52 in slot 21'. The initial force reaction is tangential (with respect to grinding axis 11) and in the direction of wedge action with edges 30–31. Grinding proceeds with turntable rotation, through the intermediate location depicted for slot 21, and to a final or parting location depicted for slot 21". Throughout grinding, the force reaction is always in a direction to produce most effective chucking and solid work-piece referencing, to assure a high-quality face-grind. At parting, the force reaction will have been reduced substantially because the desired material-removal has been accomplished, and the generally radial orientation of slot 21" (with respect to grinding axis 11) assures that any force reaction which remains at parting will have virtually zero tendency to dislodge the finished work-piece.

The finished work-pieces are then transported by turntable 13 to the unloading station 13 which in the form shown utilizes a suitable fixed arm 53, above the slotted plate 27 and in interfering relation with delivered work-pieces, such as the piece 54 in the slotted opening 55. In FIG. 1, work-piece 54 is shown at an instant when it has been dislodged from its wedged or chucked position and it is being cammed radially out of the slot 55. As it reaches the outer limit of slot 55, work-piece 54 comes under the force of a compressed-gas jet from a suitably supplied nozzle 56 carried by arm 53. Work-piece 54 is then forcibly ejected to clear the turntable and drop via a ramp or collection chute 57. If desired, an auxiliary nozzle 58 may further assist in work-piece removal.

In the modification of FIG. 3, magnet action is enhanced by restricting the gap in the magnetic circuit essentially to the region between the work-piece 22 and the adjacent pole face of element 35. The sheet 60 of non-magnetic material (such as aluminum) establishes this gap and is of limited extent, being received in suitable recesses, suggested at 61–62 in base adapter 40'. Finger elements 19–20 thus directly abut adapter 40' and establish unbroken flux-conducting paths. As a practical matter, adapter member 40' may be turned, to form the annular recess 39 for the various pole-piece elements 35, and recesses 61–62 may be counterbores for reception of a plate 60; plate 60 may thus be annular about the turntable axis, with inner and outer diameters seated in counterbores 61–62.

In the circuit of FIG. 4, I illustrate a programmed application of magnetic-chucking action for a desired portion of turntable rotation, as necessary for an enhanced hold on the work-pieces, at least through the grinding region. This is schematically indicated by commutator means 65 having an effective arcuate extent for the desired purpose. Commutator 65 is shown to include a fixed arcuate conductor 66 carrying brushes or wiper arms in loaded conductive contact with the limited arcuate span of conductive segments 67–67' . . . 67" encompassed at a given instant. These segments are equal in number to the pole-pieces 38, and each is connected to the successive windings 37–37' . . . 37" to be excited as turntable 13 rotates; the segments are shown equally spaced around a disc 68 synchronized with turntable rotation. A suitable source 69 is connected to wiper bar 66. It will be seen that magnet action is selectively applied and de-energized as a function of turntable rotation, so as to permit greatest ease of loading and unloading, and greatest chucking action during the grinding phase.

The arrangement of FIG. 5 is the same as that of FIG. 2 except for the showing of a different work-piece 70 to illustrate applicability of my machine to the grinding of cylindrical journal-bearing or roller-bearing rings. Wedge action is effective to maintain lateral stability, close to the locale of grinding action, and overall stability is enhanced by magnet action.

The chief benefits of my machine are realized, however, for the case of truncated spherical inner rings of the character shown at 22 in FIG. 2, in that they present the smallest bottom-support area, for a given outside diameter. It is of course theoretically possible to achieve tangential engagement of the undercut bevels 30′–31′ with the spherical surface 23, thereby promoting surface-area contact rather than more nearly line or point contact at wedge action with surface 23. But if there is to be any projection d (to permit grinding), for a variety of ring sizes, then such tangential engagement with surfaces 30′–31′ will necessarily be below the top-surface plane of slotted plate 27, meaning that the maximum finger-supporting height D is not being utilized. I, therefore, prefer a somewhat steeply inclined undercut angle in the bevels 30′–31′, in the range of 40 to 50 degrees, to ensure maximum utilization of the dimension D, for as wide a range of bearing-ring diameters as possible, and for a given slot-configurated plate 27.

While the invention has been described in detail for the preferred forms shown, it will be understood that modifications may be made without departing from the scope of the invention as defined in the claims which follow:

I claim:

1. Apparatus for face-grinding an axial end of a bearing ring or the like, comprising a turntable having an annular ring-supporting surface and means for continuously rotating said turntable, ring-supporting means comprising plural finger elements uniformly spaced over said annular surface, said finger elements each extending in part radially and in part circumferentially with respect to the axis of turntable rotation and defining wedge-shaped ring-receiving radially outwardly open slots, whereby a ring to be ground may be seated at one end face on said annular surface and held by wedge action between adjacent fingers to expose the other end face of the ring for face-grinding; and face-grinding means comprising a continuously driven abrasive wheel supported on a rotary axis substantially parallel to but offset from the turntable axis, said abrasive wheel having a cutting surface substantially in the plane of the ring end face to be ground and in overlapping relation with ring-wedging region of at least one of the slots between fingers.

2. Apparatus according to claim 1, in which by virtue of the circumferential component of orientation of said fingers the ring-receiving slots may all be said to slope generally tangentially of the peripheral motion of said abrasive wheel near one limit of its overlap with said turntable, and in which the direction of abrasive-wheel rotation is that of entry into said slots near said one limit, whereby abrasive-frictional reaction on the ring being ground is in the direction of enhanced wedging action.

3. Apparatus according to claim 2, in which the direction of turntable rotation is opposed to the direction of grinding wheel rotation, whereby the first abrasive-wheel contact of a ring to be ground is near said one limit.

4. Apparatus according to claim 1, in which the angular convergence of adjacent edges of adjacent fingers is in the order of 10 degrees.

5. Apparatus according to claim 1, in which the angular orientation of the radially outer edge of each wedge-shaped slot is inclined in the order of 60 degrees with respect to the turntable-radius line to the point of intersection of the respective projections of adjacent edges of adjacent fingers of each said slot.

6. Apparatus according to claim 1, in which the adjacent walls of adjacent edges of adjacent fingers are undercut to localize wedge action at a region offset from said annular surface.

7. Apparatus according to claim 6, in which said undercut is an essentially flat surface at an angle in the order of 45 degrees with respect to the plane of said annular surface.

8. Apparatus according to claim 1, in which said fingers are formed as integral parts of a ring secured to said turntable at said annular surface.

9. Apparatus according to claim 1, for the face-grinding of rings of magnetic flux-conducting material, in which said turntable includes magnet means operative at said annular surface to attract and hold to said surface a ring to be ground.

10. Apparatus according to claim 9, in which said surface is defined by a non-magnetic material interposed between said magnet means and a ring-supporting region of said surface.

11. Apparatus according to claim 1, and including finished-piece removal means comprising a fixedly mounted arm overstanding the radial limits of wedge-ring support on said surface, said arm being in interfering relation with upwardly projecting ends of the ground rings advanced toward said arm upon turntable rotation past the region of overlap with said abrasive wheel.

12. Apparatus according to claim 1, and including a fixedly mounted supply platform for feeding unground rings into wedged support in turntable slots advancing toward the region of turntable overlay with said abrasive wheel, said platform including a transfer surface in radial-clearance relation with and in substantially the plane of said annular surface.

13. Apparatus according to claim 1, and including finished-piece removal means comprising fixedly mounted jet means overstanding the region of wedged-ring support at a turntable location past the region of overlap with said abrasive wheel, said jet means directing a blast of compressed gas in the general direction outwardly of said slots.

14. Apparatus for face-grinding an axial end of a bearing ring or the like, comprising a turntable having an annular ring-supporting surface and means for continuously rotating said turntable, ring-supporting means comprising plural finger elements uniformly spaced over said annular surface, said finger elements each extending in part radially and in part circumferentially with respect to the axis of turntable rotation and defining wedge-shaped ring-receiving radially outwardly open slots, whereby a ring to be ground may be seated at one end face on said annular surface and held by wedge action between adjacent fingers to expose the other end face of the ring for face-grinding; selectively operable magnet means carried by said turntable and operative at said annular surface in the ring-wedging region of each slot to attract and hold to said annular surface a ring to be ground; and face-grinding means comprising a continuously driven abrasive wheel supported on a rotary axis substantially parallel to but offset from the turntable axis, said abrasive wheel having a cutting surface substantially in the plane of the ring end face to be ground and in overlapping relation with ring-wedging region of at least one of the slots between fingers.

15. Apparatus according to claim 14, in which said selectively operable means includes means synchronized with turntable rotation and effective to locally provide magnet action essentially at the slots currently exposed to grinding action in said region of overlap.

16. Apparatus according to claim 14, and including a ring-loading station and a ring-unloading station at spaced angular locations about the turntable axis and on opposite sides of said region of overlap, said selectively operable means including means synchronized with turntable rotation and effective to locally provide magnet action essentially at the slots currently exposed to grinding action in said region of overlap, to the substantial exclusion of magnetic action at said loading and unloading stations.

17. A chuck for supporting a bearing ring or the like for face-grinding an axial end thereof, comprising means including a flat ring-supporting surface of non-magnetic material, magnet means including a pole piece so positioned beneath said surface that a steel bearing ring or the like placed on said surface in the region of said pole piece will be included in the magnet circuit of said pole piece, and two finger elements secured on said surface in spaced and diverging relation to define a wedge-shaped ring-receiving opening overstanding said pole piece.

18. The chuck of claim 17, in which said fingers are of magnetic flux-conducting material.

19. The chuck of claim 18, in which said pole piece forms with each one of said fingers a separate magnetic flux-conducting path characterized by a gap in the region of said ring-receiving opening, whereby the presence of an inserted ring in wedged position between said fingers effects substantial closure of said gap.

References Cited

UNITED STATES PATENTS

| 1,336,928 | 4/1920 | Simmons. | |
| 2,386,742 | 10/1945 | MacNeill | 51—108 |
| 2,434,245 | 1/1948 | Johnson | 51—108 |
| 2,765,592 | 10/1956 | Krug | 51—134 |

HAROLD D. WHITEHEAD, Primary Examiner

U.S. Cl. X.R.

51—237